United States Patent
Yamada et al.

(10) Patent No.: US 6,678,568 B1
(45) Date of Patent: Jan. 13, 2004

(54) SHEET METAL WORKING GRAPHIC DATA GENERATION METHOD AND APPARATUS

(75) Inventors: Satoshi Yamada, Isehara (JP); Masanobu Ishii, Isehara (JP); Yoshito Inoichi, Isehara (JP)

(73) Assignee: Amada Company Limited, Kanagawa (JP)

( * ) Notice: Subject to any disclaimer, the term of this patent is extended or adjusted under 35 U.S.C. 154(b) by 0 days.

(21) Appl. No.: 09/674,523

(22) PCT Filed: May 20, 1999

(86) PCT No.: PCT/JP99/02649

§ 371 (c)(1),
(2), (4) Date: Jan. 22, 2001

(87) PCT Pub. No.: WO99/60528

PCT Pub. Date: Nov. 25, 1999

(30) Foreign Application Priority Data

May 21, 1998 (JP) .......................................... 10-140195

(51) Int. Cl.⁷ .............................................. G06F 19/00
(52) U.S. Cl. ........................ 700/98; 700/145; 700/182; 700/206; 345/964
(58) Field of Search .............................. 700/95–98, 145, 700/182, 206; 345/420, 964; 703/1

(56) References Cited

U.S. PATENT DOCUMENTS

| | | | | |
|---|---|---|---|---|
| 4,912,644 A | * | 3/1990 | Aoyama et al. | ............... 700/98 |
| 5,268,999 A | | 12/1993 | Yokoyama | |
| 5,587,914 A | * | 12/1996 | Conradson et al. | ........... 700/95 |
| 5,689,435 A | | 11/1997 | Umney et al. | |
| 6,009,378 A | * | 12/1999 | Tang et al. | .................... 702/34 |
| 6,144,896 A | | 11/2000 | Kask et al. | |
| 6,185,476 B1 | | 2/2001 | Sakai | |
| 6,256,547 B1 | * | 7/2001 | Tognon | ........................ 700/97 |
| 6,353,768 B1 | * | 3/2002 | Karafillis et al. | .............. 700/97 |
| 6,400,363 B1 | * | 6/2002 | Masuda et al. | ............. 345/420 |
| 6,542,937 B1 | * | 4/2003 | Kask et al. | .................. 709/328 |

FOREIGN PATENT DOCUMENTS

| | | |
|---|---|---|
| EP | 0187065 | 7/1986 |
| EP | 0402475 | 12/1990 |
| EP | 0419013 | 3/1991 |
| WO | 97/42608 | 11/1997 |

OTHER PUBLICATIONS

Lin et al., "Sheet metal products: database in support of their process planning and surface development", International Journal of Computer Integrated Manufacturing, Nov.–Dec. 1998, vol. 11, No. 6, pp. 524–533.

* cited by examiner

Primary Examiner—Albert W. Paladini
Assistant Examiner—Elliot Frank
(74) Attorney, Agent, or Firm—Greenblum & Bernstein, P.L.C.

(57) ABSTRACT

A sheet metal working graphic data generation method includes displaying respective planes constituting a solid input based on two-dimensional three side views on a screen. The method also includes obtaining and displaying a temporary development diagram obtained by butting a butting plane with a reference plane when the reference plane and the butting plane are selectively specified from the respective planes. The method further includes generating a solid figure by bending the temporary development diagram according to the bending condition; and displaying a perspective view based on the solid figure interlockingly in a region different from the temporary development diagram on the screen.

12 Claims, 12 Drawing Sheets

| GaiPi | X | Y | Z |
|---|---|---|---|
| | XGa | YGa | 0 |
| | ⋮ | ⋮ | ⋮ |
| GaiPi | XGb | YGb | 0 |

| GaiPi | X | Y | Z |
|---|---|---|---|
| | XGa | YGa | ZGa |
| | ⋮ | ⋮ | ⋮ |
| GaiPi | XGb | YGb | ZGb |

SHEET METAL WORKING GRAPHIC DATA GENERATION METHOD AND APPARATUS

TECHNICAL FIELD

The present invention relates to an automatic programming apparatus capable of generating a temporary development diagram by butting respective planes of three side views by operator control and further displaying a perspective view thereof interlockingly with that temporary development diagram.

BACKGROUND ART

Recently, line control system has been applied to machine tools (bendingmachine, lasermachine, punching machine, etc.). In such a line control system, as shown in FIG. 1, an automatic programming apparatus (CAE) 1 having CAD/CAM function and a host machine 2 which is a server are disposed in office and these high order apparatuses are connected to machine tools (NCT/ laser, bender) on site as lower order apparatus through LAN via a terminal 3, terminal 4 and NC unit 5.

An operator generates a development diagram by imaging a solid figure in the brain based on three side views using CAD function of the automatic programming apparatus 1 so as to obtain a processing program for NCT/laser. After that, with the CAM function, an appropriate tool is allocated for a development diagram generated by the CAD or a laser trajectory is obtained, and such a processing program is transmitted to the host machine 2.

An elongation value is used for generation of the aforementioned development diagram. This elongation value is determined depending on the characteristic of a bender for use and a condition particular for user by referring to an elongation value table.

However, in the conventional automatic programming apparatus, the operator has to generate a development diagram by imaging a solid figure in mind. Therefore, if the solid is complicated, nobody than an experienced operator can generate an accurate development diagram.

Further, the conventional development diagram is determined based on the elongation value table and generation of the development diagram depends on development of a figure in the brain of the operator. Therefore, it is difficult to obtain an accurate development diagram fitting to actual condition of a site. Thus, conventionally, the development diagram generated in that manner has been used for only generation of a processing program for NCT/laser.

DISCLOSURE OF INVENTION

Accordingly, it is an object of the present invention to provide an automatic programming apparatus for sheet metal working integrated support system capable of obtaining an accurate development diagram easily using an actual elongation value without mentally imaging its solid figure.

To achieve the above object, according to an aspect of the present invention, there is provided a sheet metal working graphic data generation method comprising the steps of: displaying respective planes constituting a solid input based on two-dimensional three side views on a screen; obtaining and displaying a temporary development diagram obtained by butting a butting plane with a reference plane when the reference plane and the butting plane are selectively specified from the respective planes; generating a solid figure by bending the temporary development diagram according to the bending condition; and displaying a perspective view based on the solid figure interlockingly in a region different from the temporary development diagram on the screen.

In a preferred embodiment of the present invention, when the butting plane is butted with the reference plane, bending attribute information is retrieved from the bending condition and the butting plane is butted so as to possess an overlapping area corresponding to an elongation value contained in the retrieved bending attribute information.

In a preferred embodiment of the present invention, when the solid figure is generated from the temporary development diagram, the temporary development diagram is expressed on three dimensional coordinates, three-dimensional coordinate data indicating the temporary development diagram is subjected to affine transformation based on the bending condition, and a sheet thickness is attached to its result so as to generate the solid figure.

In a preferred embodiment of the present invention, a bending line is attached to the overlapping area.

In a preferred embodiment of the present invention, when no bending attribute information coinciding with the bending condition exists, an estimated elongation value is obtained using finite element method based on the bending condition and the butting plane is butted with the reference plane so as to possess an overlapping area corresponding to the obtained estimated elongation value.

Further, to achieve the above object, according to another aspect of the present invention, there is provided an automatic programming apparatus comprising: a plane synthesizing portion for recognizing a plane having a side specified first to be a reference plane and a plane having a side specified later to be a butting plane, from respective planes constituting a solid inputted based on three side views and for moving the butting plane so that the specified side of the butting plane overlaps the specified side of the reference plane so as to obtain a temporary development diagram; and a solid figure generating portion for generating a solid figure by bending the temporary development diagram according to bending information.

In a preferred embodiment of the present invention, the plane synthesizing portion retrieves bending attribute information corresponding to the bending condition from data base, buts the butting plane with the reference plane so as to possess an overlapping area corresponding to an elongation value contained in the retrieved bending attribute information, and adds a bending line to the overlapping area.

In a preferred embodiment of the present invention, the solid figure generating portion expresses the temporary development diagram on three-dimensional coordinates, subjects three-dimensional coordinate data expressing the temporary development diagram to affine transformation based on the bending condition, and adds a sheet thickness to its result so as to generate the solid figure.

In a preferred embodiment of the present invention, the automatic programming apparatus further comprises a perspective view drawing portion for generating a perspective view by subjecting the solid figure to rendering and indicating a corner portion in a different color from the other portions with an enlargement instruction for the corner portion in the perspective view.

Still further, to achieve the above object, according to still another aspect of the present invention, there is provided a computer readable storage medium for storing a sheet metal working graphic data generation program comprising the steps of: storing information of respective planes constituting a solid inputted based on three side views in a memory;

recognizing a plane by recognizing an external frame closed loop by tracing on each side of the respective planes; specifying a side of each of two planes from the respective planes, recognizing a closed plane loop having a side specified first to be reference plane and a closed plane loop having a side specified later to be butting plane; inputting a bending condition; moving the butting plane so that the specified side of the butting plane overlaps the specified side of the reference plane so as to obtain a temporary development diagram; expressing the temporary development diagram on three-dimensional coordinates, subjecting three-dimensional coordinate data expressing the temporary development diagram to affine transformation based on the bending condition, and adding a sheet thickness to a result thereof so as to generate a solid figure; and generating a perspective view by subjecting the solid figure to rendering.

In a preferred embodiment of the present invention, in the step for butting the butting plane with the reference plane, bending attribute information corresponding to the bending condition is retrieved from data base and the butting plane is butted with the reference plane so as to possess an overlapping area corresponding to an elongation value contained in the retrieved bending attribute information.

In a preferred embodiment of the present invention, in the step for butting the butting plane with the reference plane, when no bending attribute information coinciding with the bending condition exists in data base, an estimated elongation value is obtained using finite element method based on the bending condition and the butting plane is butted with the reference plane so as to possess an overlapping area corresponding to the obtained estimated elongation value.

The nature, principle and utility of the invention will become more apparent from the following detailed description when read in conjunction with the accompanying drawings.

BEST MODE FOR CARRYING OUT THE INVENTION

Figure 1:
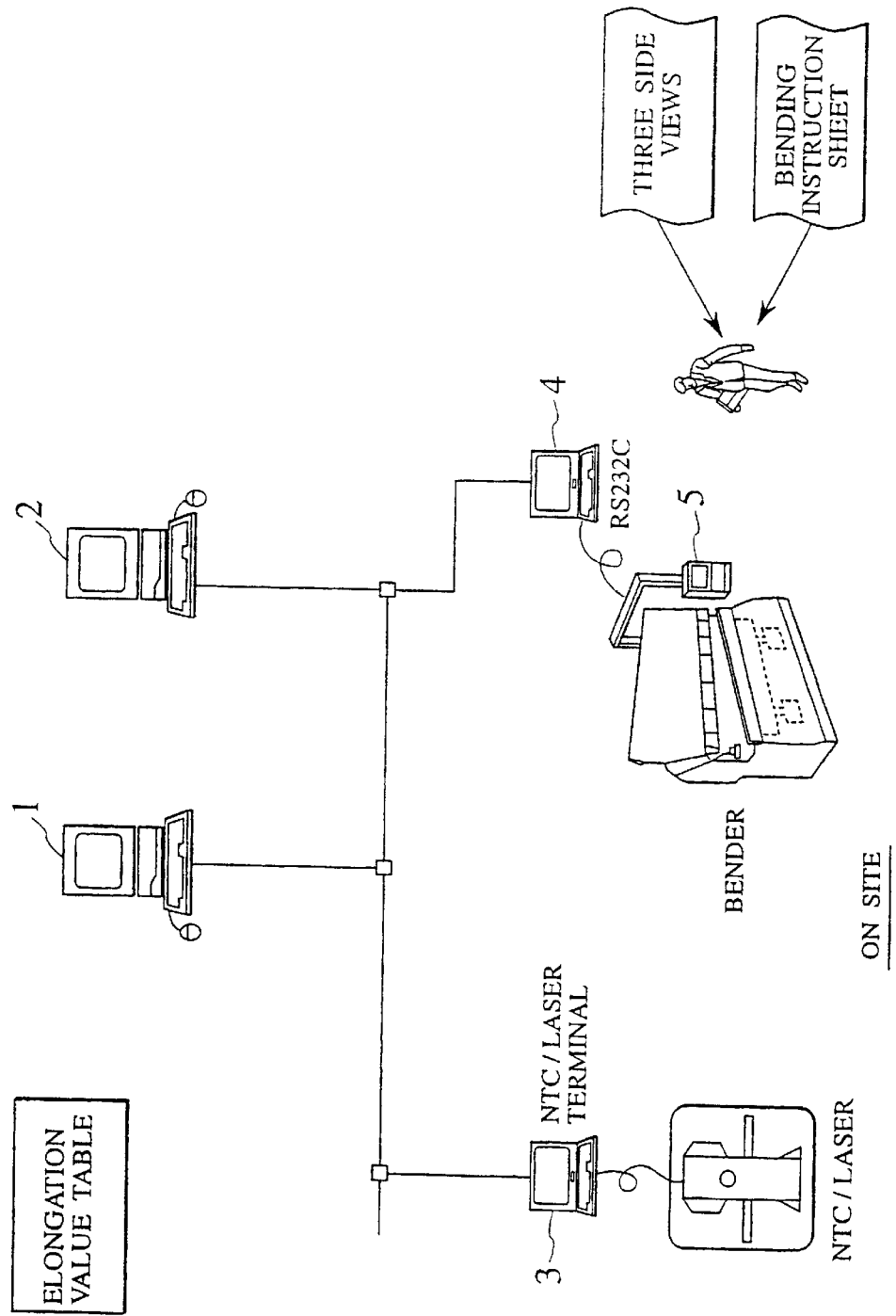
FIG. 1 is a schematic structure diagram of a conventional machine tool line control system.
Figure 2:
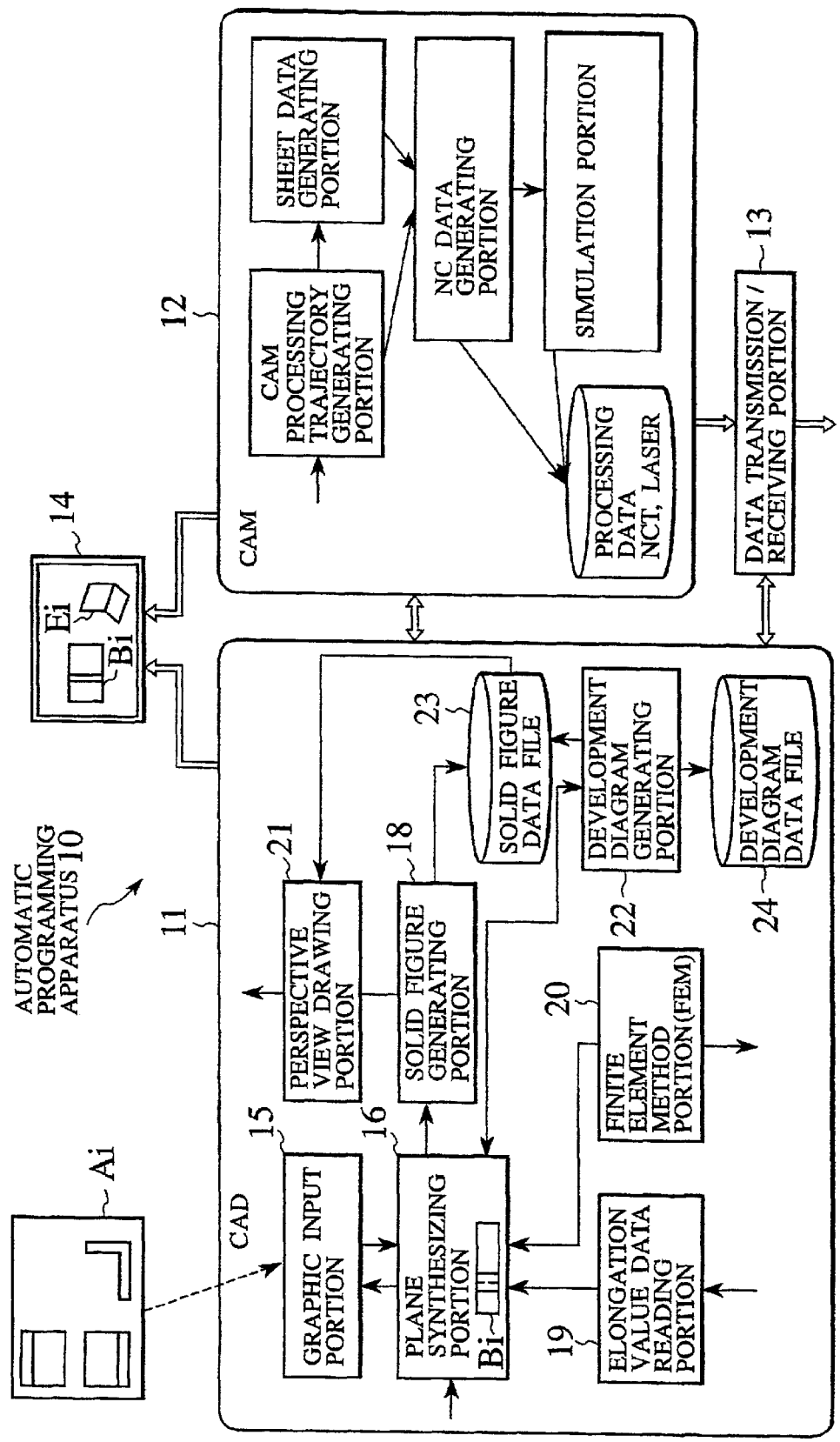
FIG. 2 is a schematic structure diagram of an automatic programming apparatus of sheet metal working integrated support system of this embodiment.

FIG. 2 is a schematic structure diagram of an automatic programming apparatus of a sheet metal working integrated support system of this embodiment. This automatic programming apparatus 10 comprises a 2.5 dimensional CAD 11, a CAM 12 and a data transmission/receiving portion 13 and communicates with a host machine (not shown) so as to receive on-site bending attribute information (elongation value) accumulated in the host machine. Then, the automatic programming apparatus 10 displays plane information of each plane constituting a three-dimensional figure, inputted based on three side views Ai (two dimensional views) on a screen 14 and then displays a plane synthesized diagram Bi obtained by butting these planes each other by means of the CAD 11 and a three-dimensional figure Ei based on this plane synthesized diagram Bi (also called temporary development diagram) on the screen 14 as shown in FIG. 2.

That is, interlocked display of the solid figure Ei by means of the CAD 11 is support information for the plane synthesized diagram Bi. Therefore, by only specifying bending angle, direction and the like, the plane synthesized diagram Bi and solid figure Ei are displayed without operator's imaging. Thus, it is easy to make sure whether or not proper planes have been butted with each other or bending has been instructed with a proper angle and direction in order to obtain an accurate solid figure based on the three side views.

Then, the CAD 11 computes for interference of a flange and dies and then corrects the plane synthesized diagram Bi based on this computation result. After that, it computes for extracting outside frame loop and bending lines so as to obtain a final development diagram.

The CAM 12 receives this development diagram, generates an optimum processing program (NC data) for processing trajectory, dies preparation and the like based on the development diagram and transmits this to a machine tool. Further, this CAM 12 displays simulation views based on this processing program.

The automatic programming apparatus 10 has a data transmission/receiving portion 13 for carrying out data transmission and reception according to a format in which part number and its related attribute information are attached to each data.

Structure of Each System

The CAD 11 includes a graphic input portion 15, a plane synthesizing portion 16, a solid Figure generating portion 18, an elongation value data reading portion 19, an finite element method portion 20, a perspective view drawing portion 21 and a development diagram generating portion 22.

The graphic input portion 15 stores each plane information constituting a solid based on the three side views Ai inputted by an operator in a memory.

When a side of each of two planes is selectively specified from the planes stored in the memory, the plane synthesizing portion 16 defines a closed plane loop having the first specified side as a reference plane and a closed plane loop having a later specified side as a butting plane.

The plane synthesizing portion 16 generates a plane synthesized diagram Bi by moving the specified side of the butting plane so that the specified side of the butting plane overlaps the specified side of the reference plane (overlapping area) on the memory and then displays it on the screen 14. If an elongation value is specified, the overlapping area of this plane synthesized diagram Bi is an overlapping area of a width based on that elongation value and if that elongation value is not specified, the overlapping area is an overlapping area of a width of, for example, a sheet thickness t (also called offset).

If the elongation value is specified, the plane synthesizing portion 16 shortens the overall dimensions of the plane synthesized diagram Bi and corrects so that the overlapping area is expanded and then adds a bending line to this overlapping area (also called bending area).

The plane synthesizing portion 16 displays a dialog window (bending angle, inner radius, elongation value, bending direction, bending type, etc.: bending condition Ji) when a side of the reference plane and a side of the butting plane are specified.

Then, if the plane synthesizing portion 16 is notified that this dialog window is filled with the bending condition Ji, it obtains the aforementioned plane synthesized diagram Bi based on the bending condition Ji and activates the solid figure generating portion 18 at the same time.

The solid figure generating portion 18 bends the plane synthesized diagram Bi in the memory, expressed in two-dimensional coordinate system with respect to the bending angle and bending direction, on the three-dimensional coordinates (based on the bending line) so as to generate a solid model (surface model) and then each coordinate of this solid model is stored in a solid figure data file 23. That is, this is 2.5 dimensional CAD rather than the three-dimensional CAD. The generation of this solid figure will be described in detail later.

The perspective view drawing portion 21 fetches in the surface model through the solid figure generating portion 18 and displays a perspective view projected to a screen space. Further, the perspective view drawing portion 21 has such functions for rotation, coloring, enlargement and the like.

When the elongation value is selected from the dialog window of the plane synthesis, the elongation value data reading portion 19 is activated so as to determine whether or not there is bending attribute information Fi which coincides with the bending condition Ji such as plate thickness, material, bending angle, bending type (V bending, etc.) and the like in a file (not shown). If such information exists in that file, the elongation value data included in that bending attribute information. Fi is set in the plane synthesis dialog window.

If there is no bending attribute information Fi which coincides with the file bending condition Ji, the elongation value data reading portion 19 starts the finite element method portion 20 and transmits the bending condition Ji to the finite element method portion 14.

Figure 3:
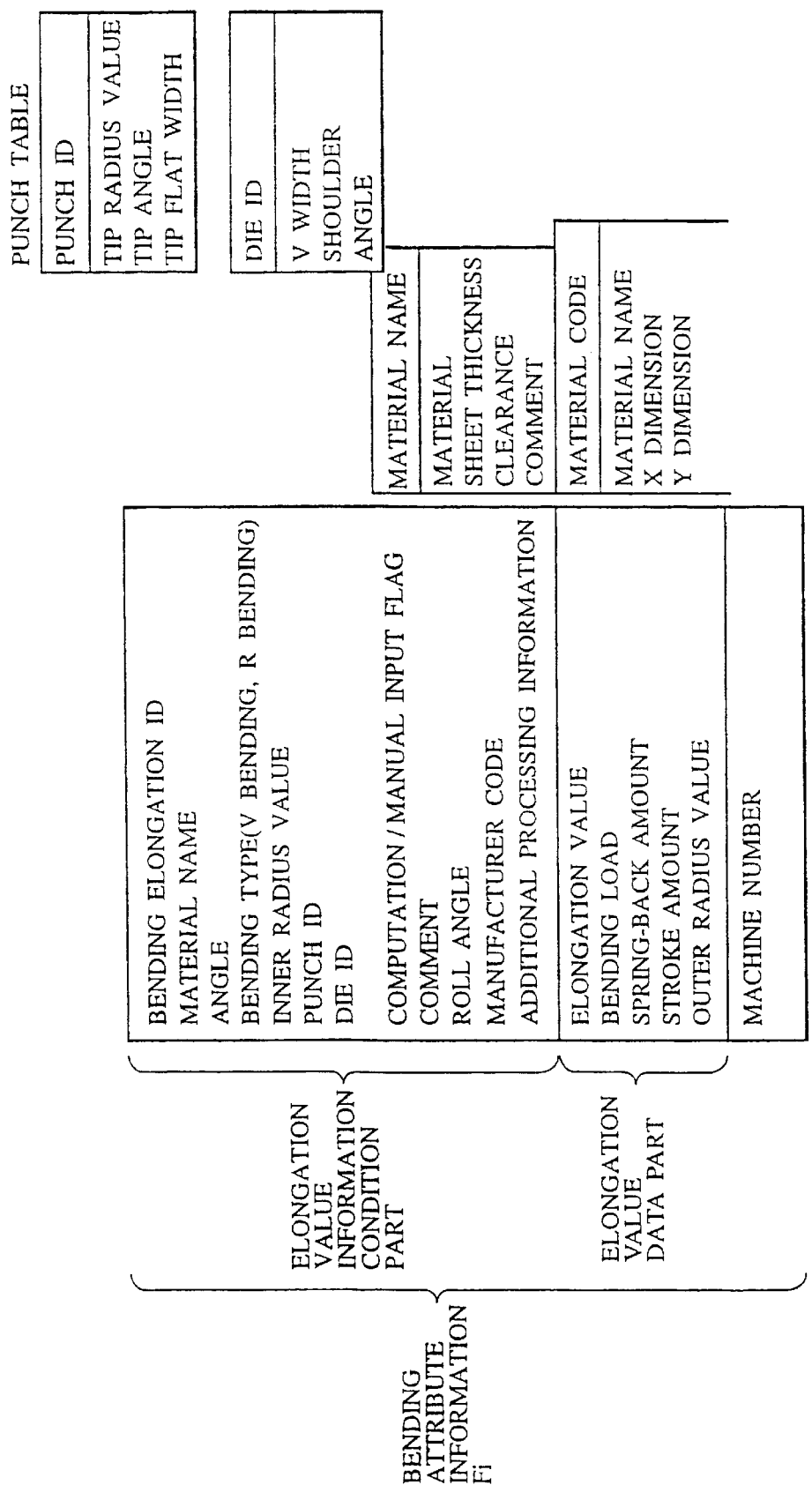
FIG. 3 is an explanatory diagram for explaining bending attribute information.

Machine numbers are attached to the bending attribute information Fi as shown in FIG. 3. This bending attribute information Fi comprises elongation value information condition part including bending elongation ID, material name, angle and the like, and elongation value data part including the elongation value, bending load, spring back amount and the like.

The finite element method portion 20 reads material, bending angle, bending direction and the like according to the bending condition Ji so as to obtain an object stroke amount for a punch to obtain that bending angle, and deflects a workpiece using elastoplasticity finite element method according to an object stroke amount, and obtains an estimated elongation value when that deflection angle coincides with the bending angle.

The finite element method portion 20 sets this elongation value in the plane synthesizing portion 16 instead of the elongation value data reading portion 19 and stores an obtained elongation value and the bending condition Ji when this elongation value is obtained.

The development diagram generating portion 22 corrects the plane synthesized diagram Bi based on a computation result on interference of the flange and dies, and computes for extracting the external frame loop and bending lines from this plane synthesized diagram Bi so as to obtain a final development diagram. Then, this development diagram is registered in the development diagram data file 24.

Whether or not the aforementioned interference with the flange occurs is determined by a graphic editing portion (not shown) and whether or not the aforementioned interference between the dies and flange occurs is determined by an inverse simulation processing portion (not shown). Correction of the plane synthesized diagram Bi is carried out by a temporary development correcting portion (not shown).
(Operation)

An operation of the automatic programming apparatus 10 having such a structure will be described below.

The automatic programming apparatus 10 of this embodiment controls a keyboard (not shown), a mouse and respective programs, contains a multi-window display/control portion for carrying out multi-window display and displays the plane synthesized diagram Bi and perspective view diagram Ei at the same time.

Figure 4:
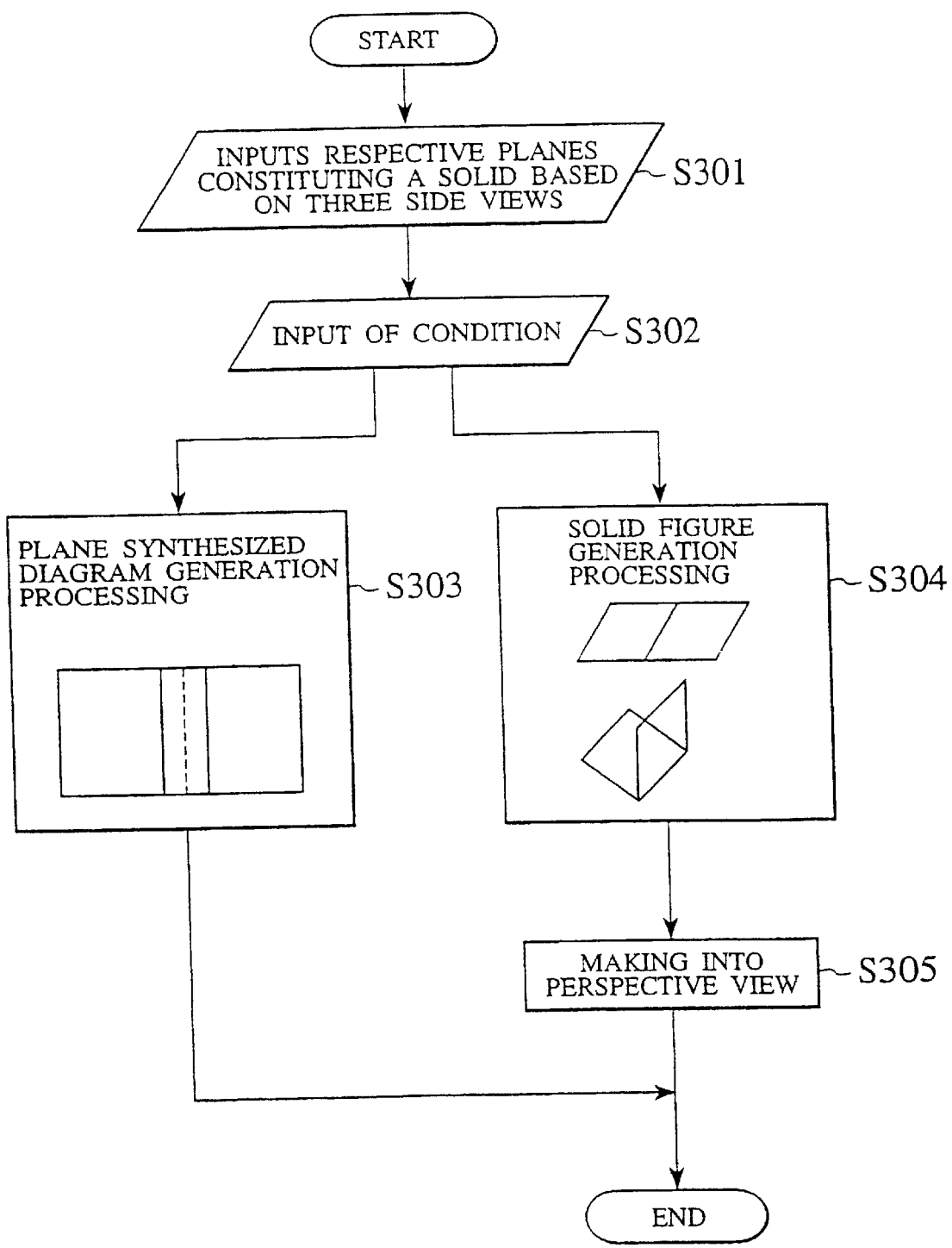
FIG. 4 is a flow chart for explaining a schematic operation of an automatic programming apparatus of this embodiment.

FIG. 4 is a flow chart for explaining a schematic operation of the automatic programming apparatus of this embodiment.

As shown in FIG. 4, the graphic input portion 15 inputs each plane constituting a solid according to its three side views (S301). Then, the graphic input portion 15 inputs bending condition Ji, butting condition and the like (S302).

After these conditions are inputted, the plane synthesizing portion 16 carries out plane synthesis processing (S303) and the solid figure generating portion 18 carries out solid figure generation processing (S304) at the same time. The perspective view drawing portion 21 generates a perspective view by subjecting a solid figure generated by the solid figure generating processing to rendering (S305).

Figure 5:
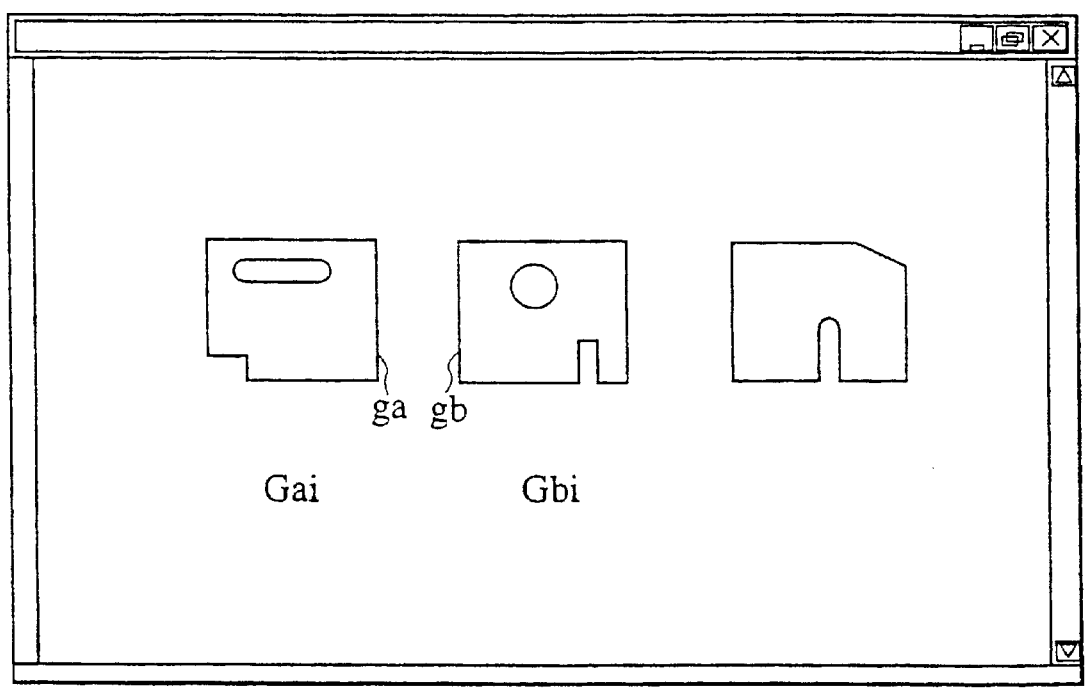
FIG. 5 is an explanatory diagram about each side information inputted based on the three side views.

The above-described plane synthesis processing will be described. The plane synthesizing portion 16 carries out plane recognition processing prior to the plane synthesis processing. Respective planes constituting a solid based on three side views are indicated on the screen 14 by the graphic input portion 15 as shown in FIG. 5.

The plane synthesizing portion 16 carries out plane recognition processing by recognizing the external frame closed loop along sides of each plane constituting an inputted solid. If there is a line (hole or the like) which cannot be traced from the external frame closed loop, the plane synthesizing portion 16 regards that there is other inner loop and recognizes it by the same processing as the external frame closed loop.

Figure 6:
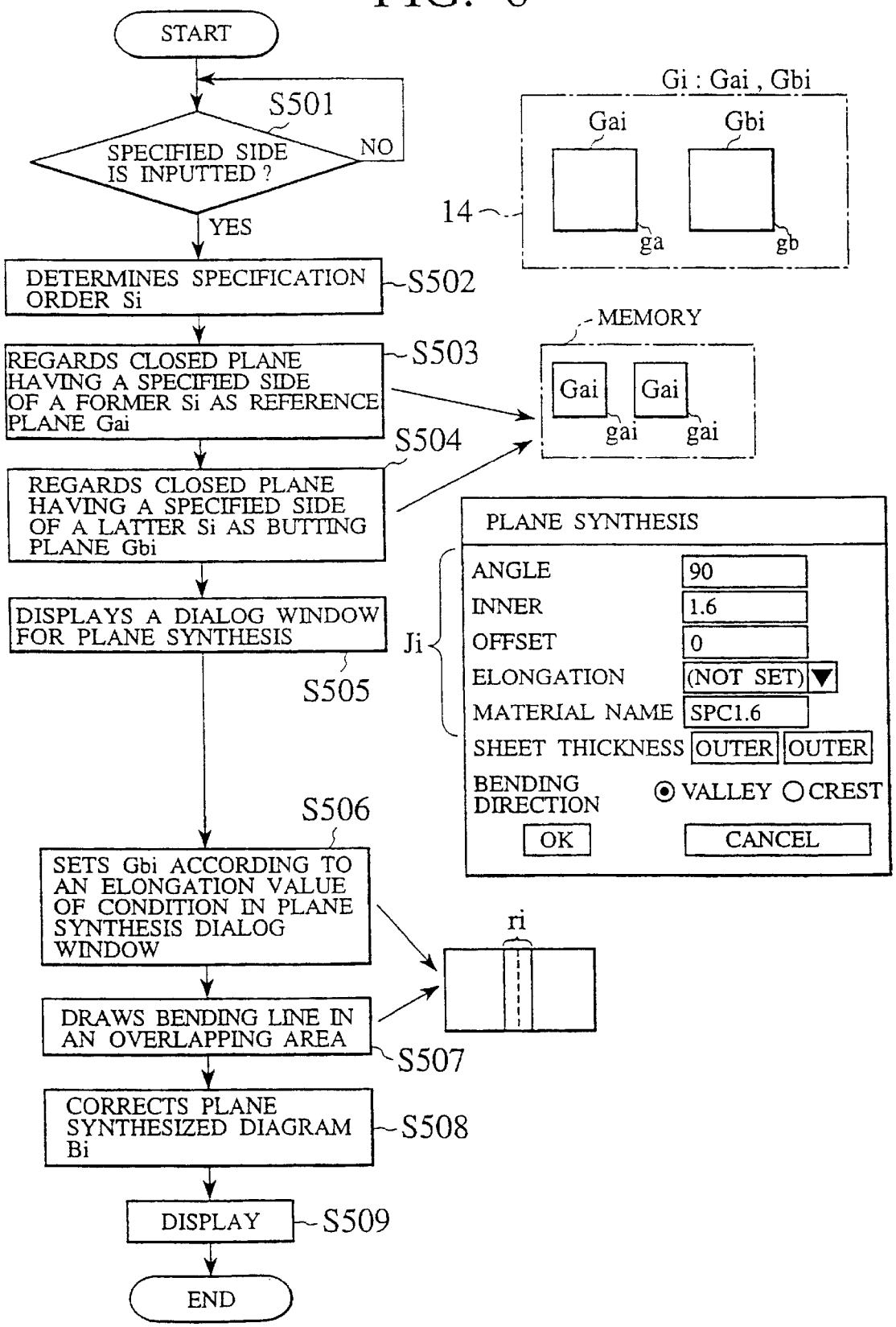
FIG. 6 is a flow chart for explaining plane synthesis processing.

FIG. 6 is a flow chart for explaining the plane synthesis processing. The plane synthesizing portion 16 monitors whether or not a side (specified side gai, or gb) of each of two closed plane loops Gi (Gai, Gbi) of planes indicated on the display 14 is specified by a mouse or key board (not shown) (S501). If it is determined that the specified sides ga, gb have been inputted at step S501, those specified sides are 1 displayed in different colors and the specification order Si thereof is determined (S502).

Next, the closed loop having the specified side of a former specification order is defined as a loop of reference plane Gai (S503) and the closed loop having the specified side of a latter specification order is defined as a loop of the butting plane Gbi (S504).

If, with the closed loop of FIG. 5 displayed on the screen 14, the specified side ga of the closed loop Gai and the specified side gb of the closed loop Gbi are specified, the closed loop having the specified side ga is regarded as the reference plane Gai and the closed loop having the specified side gb is regarded as the butting plane Gbi.

Next, with inputs of the specified side of the reference plane Gai and the specified side of the putting plane Gbi, the dialog window for the plane synthesis is displayed (S505).

Then, the butting plane Gbi is moved so that it abuts with the reference plane Gai so as to possess a overlapping area ri corresponding to the elongation value contained in the bending condition of the plane synthesis dialog window (S506). This move is carried out using two-dimensional affine transformation indicated in the formula (1).

$$\left\{ \begin{array}{c} X^* \\ Y^* \end{array} \right\} = \left( \begin{array}{ccc} a_{11} & a_{12} & a_{13} \\ a_{21} & a_{22} & a_{23} \end{array} \right) \left\{ \begin{array}{c} X \\ Y \\ 1 \end{array} \right\} \quad (1)$$

Where:

$$\left| \begin{array}{cc} a_{11} & a_{12} \\ a_{21} & a_{22} \end{array} \right| \neq 0$$

Where $\{X^*, Y^*\}$ is a coordinate value after the transformation and $\{X, Y\}$ is a coordinate value prior to the transformation.

Next, a plane synthesized diagram Bi in which a bending line is drawn in the center of the overlapping area r of the plane synthesized diagram in the memory is obtained (S507). Here, the length of this plane synthesized diagram Bi is corrected (S508) and this plane synthesized diagram Bi is displayed on the screen 14 (S509).

Figure 7A:
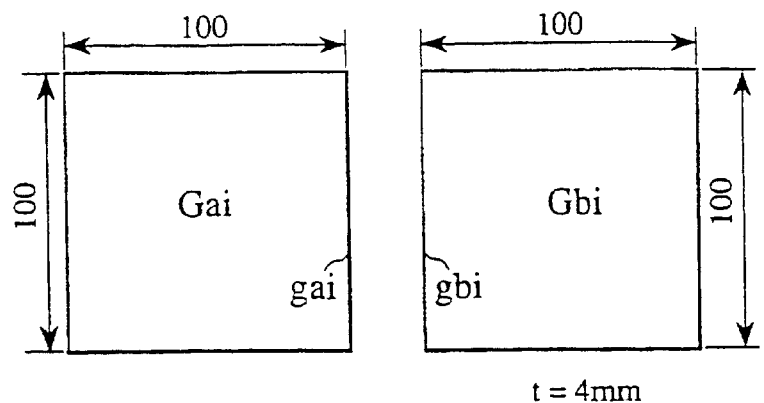
FIGS. 7A and 7B are explanatory diagrams for explaining a generation of plane synthesized diagram.

Generation of the plane synthesized diagram Bi having the overlapping area r will be described with reference to FIGS. 7A and 7B. In this case, the elongation value is 4 mm in external dimension in FIGS. 7A and 7B.

Figure 7B:
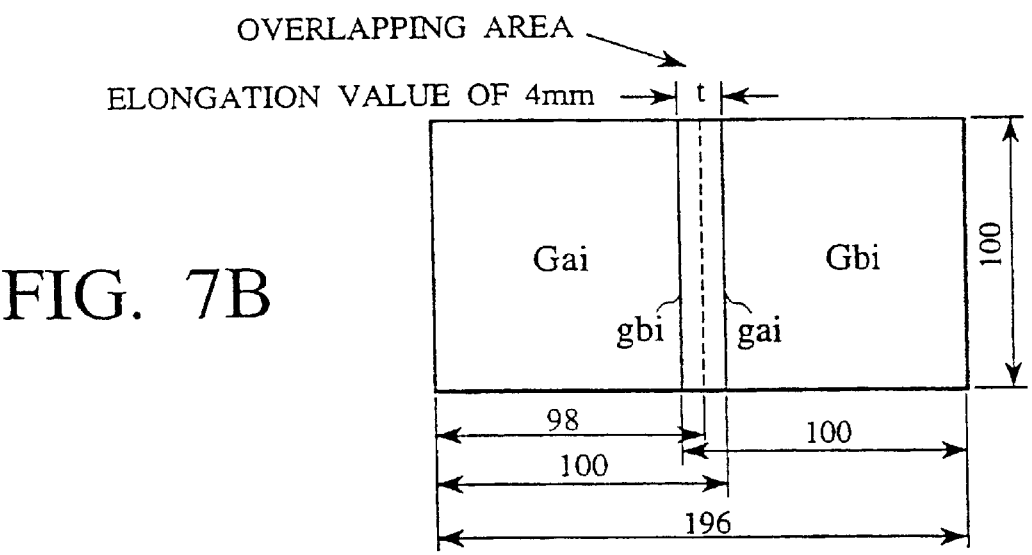

For example, assuming the reference plane Gai of 100 mm×100 mm, the butting plane Gbi of the same dimensions and that the elongation value is 4 mm, the butting plane Gbi is moved so that the specified side gbi of the butting plane Gbi overlaps the specified side gai of the reference plane Gai with an elongation value as shown in FIG. 7B. Therefore, the dimensions of both the planes are 98 mm wide if the bending line of the overlapping area is regarded as reference, and thus the overall length of the plane synthesized diagram Bi is 196 mm.

Generation of a plane synthesized diagram Bi of a case in which the elongation value is 8 mm will be described. Here, assume the reference plane Gai of 100 mm×100 mm, butting plane Gbi of the same dimensions and that the elongation value is 8 mm.

Figure 8:
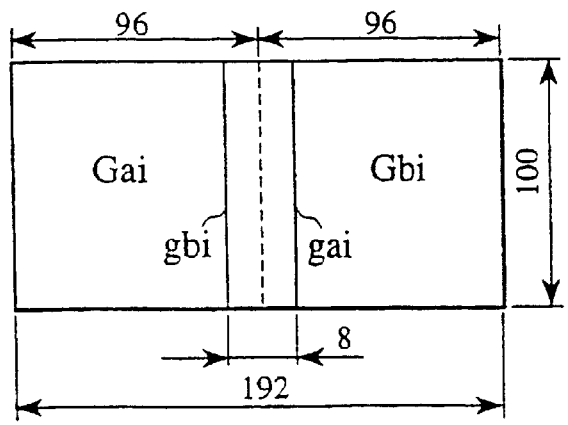
FIG. 8 is an explanatory diagram for explaining generation of plane synthesized diagram.
Figure 9:
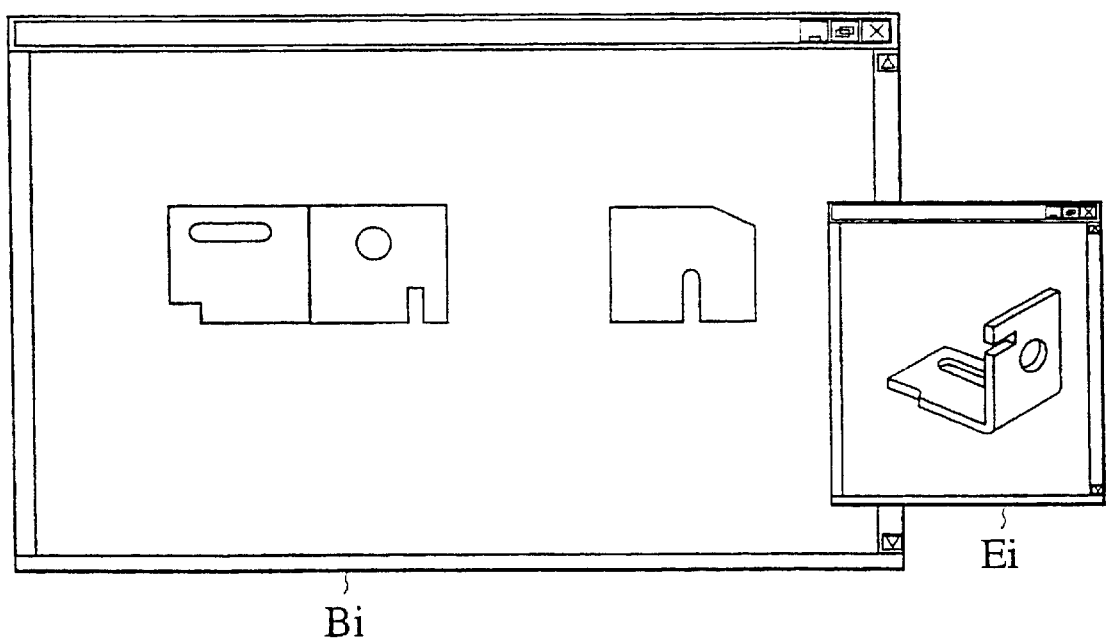
FIG. 9 is an explanatory diagram for explaining interlocking display of plane synthesized diagram and solid figure.

That is, because the overlapping area is expanded by 8 mm, the dimensions of both the planes become 96 mm wide if the bending line of the overlapping area ri is taken as reference line, and thus the overall length of the plane synthesized diagram Bi is changed to 192 mm Next, the perspective view generation processing will be described. The solid figure generating portion 18 displays a perspective view Ei based on the plane synthesized diagram Bi on the screen 14 at the same time. That is, as shown in FIG. 9, the plane synthesized diagram Bi and perspective view Ei are displayed at the same time. FIG. 9 indicates a case in which the overlapping area is minute and here, a butting portion is indicated by a line (bending line). If this butting portion line is enlarged, the overlapping area is indicated as shown in FIG. 7B or FIG. 8.

Figure 10A:
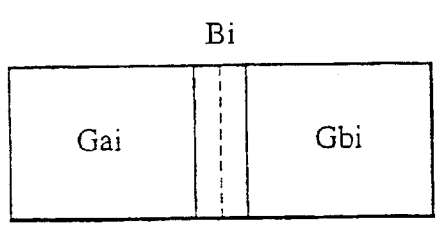
FIGS. 10A and 10B are explanatory views for explaining a process for converting two-dimensional figure to three-dimensional figure.

Then, a process for generation the perspective view will be described with reference to FIGS. 10A and 10B. The solid figure generating portion 18 reads a plane synthesized diagram Bi in the memory and then reads each vertex coordinate Pi on two-dimensional coordinates of the plane synthesized diagrams Gai, Gbi and transforms these vertex coordinates GaiPi, GbiPi to three dimensional coordinates. For example, the Z coordinate is defined as "0".

Figure 10B:
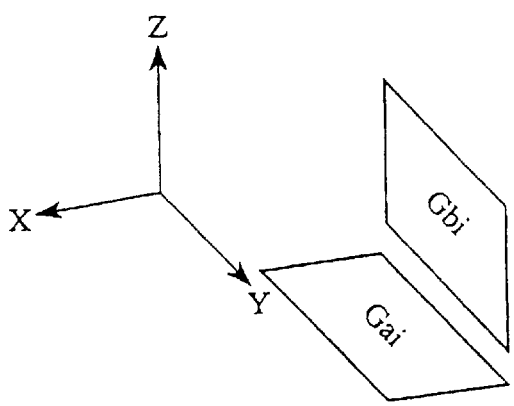

As shown in FIG. 10B, according to the bending condition Ji and bending direction, these three dimensional data is subjected to three dimensional affine transformation as shown in the formula (2) so as to generate a reference solid figure and each vertex coordinate of this reference solid figure is written as three-dimensional coordinate. That is, for example, the Z coordinate (ZGa, ZGb) is written instead of the Z coordinate value "0".

$$\left\{ \begin{array}{c} X^* \\ Y^* \\ Z^* \end{array} \right\} = \left( \begin{array}{cccc} a_{11} & a_{12} & a_{13} & a_{14} \\ a_{21} & a_{22} & a_{23} & a_{24} \\ a_{31} & a_{32} & a_{33} & a_{34} \end{array} \right) \left\{ \begin{array}{c} X \\ Y \\ Z \\ 1 \end{array} \right\} \quad (2)$$

Where:

$$\left| \begin{array}{ccc} a_{11} & a_{12} & a_{13} \\ a_{21} & a_{22} & a_{23} \\ a_{31} & a_{32} & a_{33} \end{array} \right| \neq 0$$

Here, a constant a is determined by angle, sheet thickness, crest/valley and offset.

The solid figure generating portion 18 generates a surface model including a sheet thickness and registers it into the solid figure data file 23.

The perspective view drawing portion 21 inputs this solid figure data and colors this solid figure data.

Therefore, as shown in FIG. 9, a colored perspective view (solid modeled figure) is displayed with the plane synthesized diagram Bi on the screen 14.

This perspective view can be enlarged or rotated and the enlargement and rotation can be instructed with a mouse. The processing for the enlargement and rotation is carried out by the three-dimensional affine transformation as shown in the formula (2).

Therefore, at the same time when the plane synthesis is carried out, that perspective view is displayed interlockingly. Because this serves as support information for obtaining an accurate solid figure, an inexperienced operator also can execute plane synthesis for obtaining an accurate development diagram easily. This development diagram is obtained by extracting the external frame loop and bending lines of the plane synthesized diagram as described above.

Figure 11:
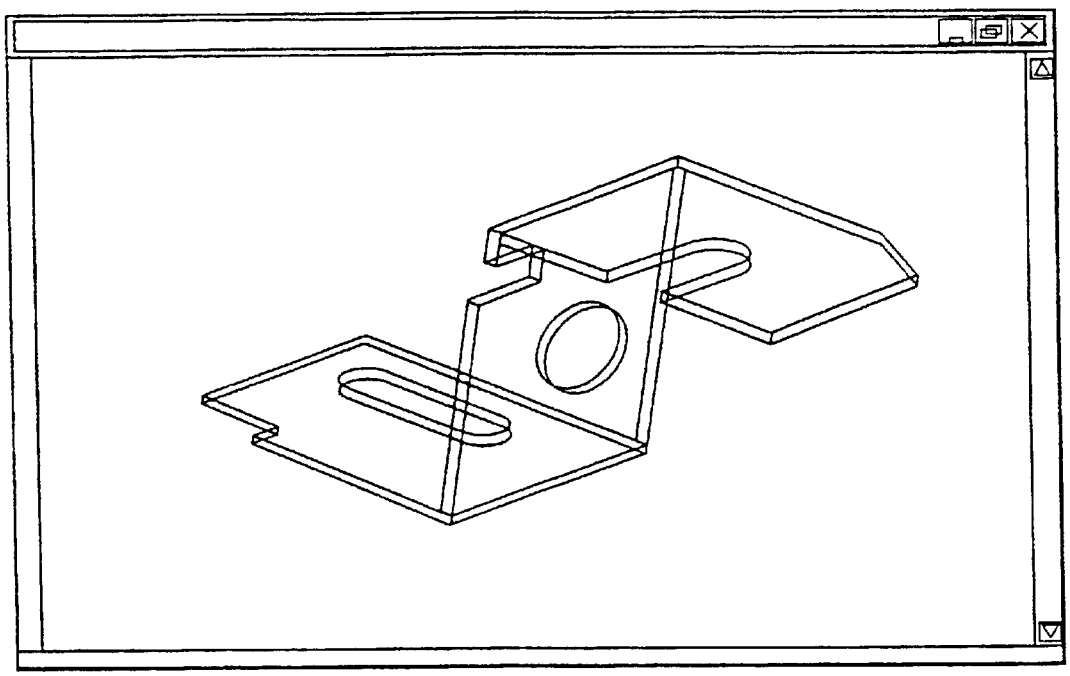
FIG. 11 is an explanatory view for explaining wire frame display.

Further, the perspective view drawing portion 21 is capable of displaying a wireframe model shown in FIG. 11 without coloring the perspective view Ei.

Figure 12:
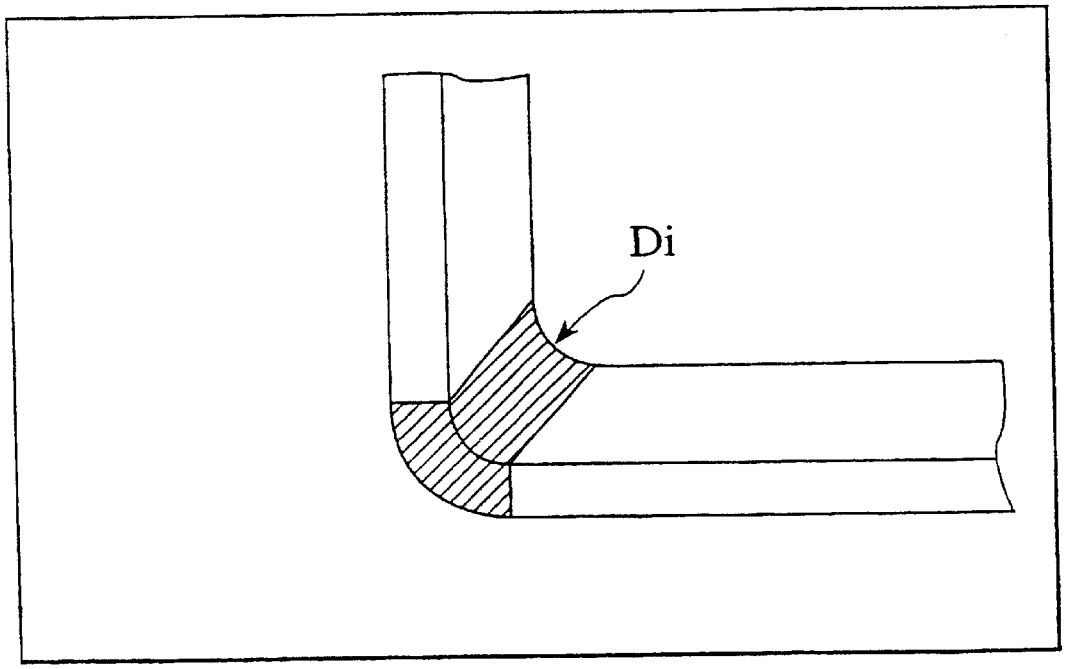
FIG. 12 is an explanatory view for explaining an enlarged display of the corner portion.

When an enlargement instruction for a corner portion of the perspective view is inputted, the perspective view drawing portion 21 displays the corner portion in a different color from the other plane as shown in FIG. 12. This is made possible because the solid figure generating portion 18 transfers information capable of identifying the corner portion Di to the perspective view drawing portion 21.

Next, an operation of the finite element method portion 20 will be described simply. The finite element method portion 20 is activated by the elongation value data reading portion 19, which reads bending condition ji (material, bending angle, bending direction and the like), and obtains an elongation value when a bending angle coincides with that bending angle.

This finite element method comprises:
(1) step for reading inputted material condition, die condition and bending angle of a product which is subjected to bending processing;
(2) step for obtaining an initial object stroke amount of a tool according to the material condition, die condition and bending angle;
(3) step for deforming the material by elastoplasticity finite element method based on each condition by following the setting of an obtained object stroke amount and obtaining a defamation image of the material after a spring-back;
(4) step for obtaining a bending angle at the time of an object stroke from the deformation image of a workpiece;
(5) step for comparing an object bending angle with a bending angle at the time of the object stroke so as to determine whether or not they are coincident with each other; and
(6) step for outputting information such as the object stroke amount, spring back amount, applied pressure, bending deformation and the like when they are coincident in the above step (5).

Figure 13:
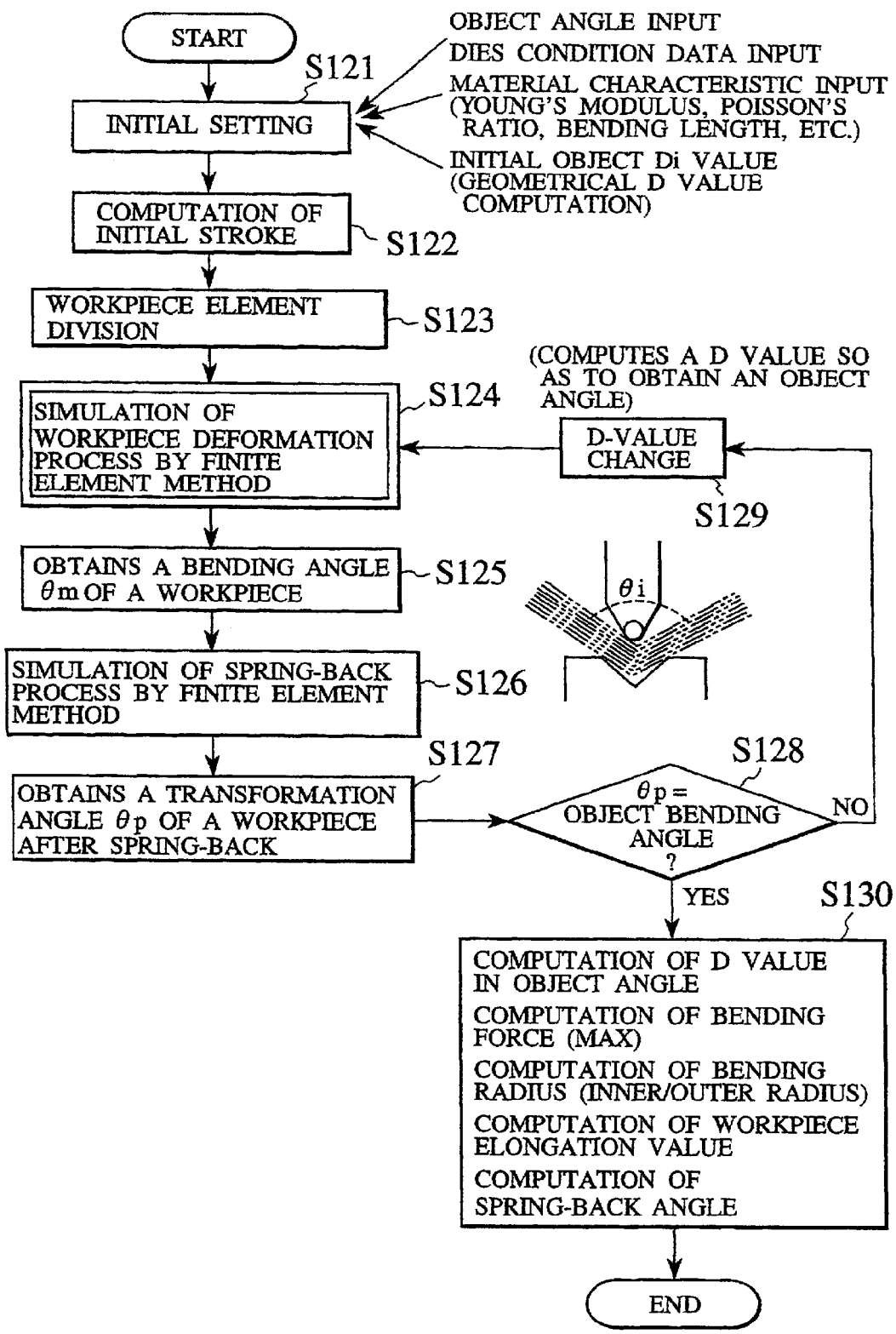
FIG. 13 is a flow chart for explaining finite-element method.

Then, processing of each step described above will be explained with reference to a flow chart of FIG. 13. The finite element method portion 20 reads workpiece condition (material, dimensions, thickness, Young's modulus, Poisson's ratio and the like), die condition and bending condition such as an object bending angle, and carries out initial setting for internal setting (S121).

Then, an initial stroke amount (D value) for obtaining an object bending angle when the punch is descended according to these conditions is obtained (S122).

Next, a sectional image of a workpiece is divided by elements (division by mesh) (S123).

Then, work deformation process is simulated according to the finite element method by descending a punch (sectional image) (S124) and a bending angle θm of a sectional image of the workpiece at this time is obtained (S125).

Next, spring-back process is carried out according to the finite element method (S126) so as to obtain a transformation angle θp of a transformation image of a workpiece after the spring-back (S127). Next, it is determined whether or not the transformation angle θp is coincident with an object angle θi (S128).

If it is determined that the work angle θp after the spring-back occurs does not arrive at the object bending angle at step S128, a D value for obtaining the object bending angle is obtained and then deformation based on the finite element method is carried out again (S129).

If it is determined that the object bending angle is reached at step S128, a D value and an elongation value of a work and the like at this time are obtained (S130).

After the plane synthesized diagram Bi is corrected, the development diagram generating portion 22 computes for extracting the external frame loop and bending lines with respect to this plane synthesized diagram Bi so as to obtain a final development diagram.

On the other hand, the CAM 12 generates optimum processing program for cutting trajectory, die diagram generated by the CAD 11 and sends it out.

It should be understood that many modifications and adaptations of the invention will become apparent to those skilled in the art and it is intended to encompass such obvious modifications and changes in the scope of the claims appended hereto.

INDUSTRIAL APPLICABILITY

According to the present invention, a temporary development diagram is obtained by butting the butting plane with the reference plane selected from respective planes inputted according to three side views and displayed, and at the same time, a perspective view generated by bending according to a bending condition is displayed interlocking with the temporary development diagram in a different region.

Therefore, because the perspective view obtained by setting together the respective planes can be recognized at the same time, there is produced an effect that the operator does not have to imagine any solid figure from three side views.

Further, because the temporary development diagram is produced by butting the respective planes using an on-site elongation value and then a perspective view is generated by bending this temporary development figure, it is possible to indicate the development diagram and the perspective view based on the elongation value obtained when a workpiece is actually bent, on the screen at the same time.

Further, because the perspective view is displayed interlockingly when the respective planes are butted with each other, an inexperienced operator can also generate an accurate development diagram for obtaining a solid figure.

Further, because rotation and enlargement of a perspective view can be carried out, the perspective view can be recognized from every direction when the temporary development diagram is generated and further, it is possible to check the condition, etc. of the corner portion.

What is claimed is:
1. A sheet metal working graphic data generation method comprising:
 displaying respective planes constituting a solid input based on two-dimensional three side views on a screen;
 specifying a reference plane and a butting plane selectively from said respective planes;
 inputting a bending condition with respect to said reference plane and said buffing plane; and
 butting said butting plane with said reference plane according to said bending condition to generate and display a temporary development diagram on the screen while bending said temporary development diagram according to said bending condition to generate a solid figure and display a perspective view based on said solid figure on a portion of the screen different from a portion of the screen where said temporary development diagram is displayed.
2. A sheet metal working graphic data generation method according to claim 1 wherein when said butting plane is butted with said reference plane, bending attribute information is retrieved from said bending condition and said butting plane is butted so as to possess an overlapping area corresponding to an elongation value contained in the retrieved bending attribute information.
3. A sheet metal working graphic data generation method according to claim 1 wherein when said solid figure is generated from said temporary development diagram, said temporary development diagram is expressed on three dimensional coordinates, three-dimensional coordinate data indicating said temporary development diagram is subjected to affine transformation based on said bending condition, and a sheet thickness is attached to its result so as to generate said solid figure.

4. A sheet metal working graphic data generation method according to claim 2 wherein a bending line is attached to said overlapping area.

5. A sheet metal working graphic data generation method according to claim 2 wherein when no bending attribute information coinciding with said bending condition exists, an estimated elongation value is obtained using a finite element method based on said bending condition and said butting plane is butted with said reference plane so as to possess an overlapping area corresponding to the obtained estimated elongation value.

6. An automatic programming apparatus comprising:

a display portion having a screen;

a data input portion for receiving data of two-dimensional three side views and a bending condition;

a plane specifying portion for selectively specifying a reference plane and a butting plane from respective planes constituting a solid input based on said two-dimensional three side views;

a plane synthesizing portion for butting said butting plane with said reference plane according to said bending condition to generate and display a temporary development diagram on the screen; and a solid figure and perspective view generating portion for, in parallel with the generating operation of said plane synthesizing portion, bending said temporary development diagram according to said bending condition to generate a solid figure and display a perspective view based on said solid figure on a portion of the screen different from a portion of the screen where said temporary development diagram is displayed.

7. An automatic programming apparatus according to claim 6 wherein said plane synthesizing portion retrieves bending attribute information corresponding to said bending condition from a data base, butts said butting plane with said reference plane so as to possess an overlapping area corresponding to an elongation value contained in the retrieved bending attribute information, and adds a bending line to said overlapping area.

8. An automatic programming apparatus according to claim 6 wherein said solid figure and perspective view generating portion expresses said temporary development diagram on three-dimensional coordinates, subjects three-dimensional coordinate data expressing said temporary development diagram to affine transformation based on said bending condition, and adds a sheet thickness to its result so as to generate said solid figure.

9. An automatic programming apparatus according to claim 8 wherein said solid figure and perspective view generating portion generates said perspective view by subjecting said solid figure to rendering and generating and indicating a corner portion in a different color from the other portions with an enlargement instruction for said corner portion in said perspective view.

10. A computer readable storage medium for storing a sheet metal working graphic data generation program comprising:

storing information of respective planes constituting a solid input based on three side views in a memory;

recognizing a plane by recognizing an external frame closed loop by tracing on each side of the respective planes;

specifying a side of each of two planes from the respective planes;

recognizing a closed plane loop having a side specified first to be a reference plane and a closed plane loop having a side specified later to be abutting plane;

inputting a bending condition with respect to said reference plane and said butting plane;

moving said butting plane so that the specified side of said buffing plane overlaps the specified side of said reference plane so as to obtain and display a temporary development diagram on a screen;

expressing said temporary development diagram on three-dimensional coordinates, subjecting three-dimensional coordinate data expressing said temporary development diagram to affine transformation based on said bending condition, and adding a sheet thickness to a result thereof so as to generate a solid figure; and generating a perspective view by subjecting said solid figure to rendering to display said perspective view on a portion of the screen different from a portion where said temporary development diagram is displayed, in parallel with an operation of displaying said temporary development diagram.

11. A computer readable storage medium for storing a sheet metal working graphic data generation program according to claim 10 wherein in the step for butting said butting plane with said reference plane, bending attribute information corresponding to said bending condition is retrieved from a data base and said butting plane is butted with said reference plane so as to possess an overlapping area corresponding to an elongation value contained in the retrieved bending attribute information.

12. A computer readable storage medium for storing a sheet metal working graphic data generation program according to claim 10 wherein in the step for butting said butting plane with said reference plane, when no bending attribute information coinciding with said bending condition exists in a data base, an estimated elongation value is obtained using a finite element method based on said bending condition and said butting plane is butted with said reference plane so as to possess an overlapping area corresponding to the obtained estimated elongation value.

* * * * *

UNITED STATES PATENT AND TRADEMARK OFFICE
CERTIFICATE OF CORRECTION

PATENT NO. : 6,678,568 B1
DATED : January 13, 2004
INVENTOR(S) : S. Yamada et al.

It is certified that error appears in the above-identified patent and that said Letters Patent is hereby corrected as shown below:

Column 12,
Line 17, "abutting" should be -- a butting --.

Signed and Sealed this

Twenty-fourth Day of August, 2004

JON W. DUDAS
*Director of the United States Patent and Trademark Office*